US010527815B2

(12) United States Patent
Kobayashi et al.

(10) Patent No.: US 10,527,815 B2
(45) Date of Patent: *Jan. 7, 2020

(54) VIBRATION ACTUATOR, AND LENS BARREL AND CAMERA PROVIDED WITH SAME

(71) Applicant: NIKON CORPORATION, Tokyo (JP)

(72) Inventors: Mina Kobayashi, Kawasaki (JP); Mamoru Inoue, Saitama (JP)

(73) Assignee: NIKON CORPORATION, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 15/190,580

(22) Filed: Jun. 23, 2016

(65) Prior Publication Data

US 2016/0308467 A1    Oct. 20, 2016

Related U.S. Application Data

(63) Continuation of application No. 13/577,461, filed as application No. PCT/JP2011/052621 on Feb. 8, 2011, now Pat. No. 9,401,666.

(30) Foreign Application Priority Data

Feb. 8, 2010    (JP) ................................. 2010-025160

(51) Int. Cl.
  *H02N 2/16*    (2006.01)
  *G02B 7/08*    (2006.01)
  (Continued)

(52) U.S. Cl.
  CPC ........... *G02B 7/08* (2013.01); *G02B 27/0006* (2013.01); *H02N 2/007* (2013.01); *H02N 2/12* (2013.01); *H02N 2/163* (2013.01)

(58) Field of Classification Search
  CPC .......... H02N 2/12; H02N 2/162; H02N 2/007; G02B 27/0006
  See application file for complete search history.

(56) References Cited

U.S. PATENT DOCUMENTS

| 5,066,884 A | 11/1991 | Takagi et al. |
| 5,172,023 A | 12/1992 | Kawai et al. |
(Continued)

FOREIGN PATENT DOCUMENTS

| JP | 63-277478 A | 11/1988 |
| JP | 2-290171 A | 11/1990 |
(Continued)

OTHER PUBLICATIONS

Feb. 17, 2015 Office Action issued in corresponding Japanese Patent Application No. 2010-025160.
(Continued)

*Primary Examiner* — J. San Martin
(74) *Attorney, Agent, or Firm* — Oliff PLC

(57) ABSTRACT

A vibration actuator that is easy to manufacture and has good driving performance, and a lens-barrel and a camera provided with the same. The vibration actuator is provided with an oscillator that generates oscillations; and a relative movement member that is pressure contacts the oscillator, and moves relative to the oscillator due to the oscillation. Either a contact face of the oscillator with respect to the relative movement member or a contact face of the relative movement member with respect to the oscillator is a thermosetting resin film that is formed of polyamide-imide resin and fluororesin, and the other contact face is an anodic oxide film.

7 Claims, 5 Drawing Sheets

(51) Int. Cl.
G02B 27/00 (2006.01)
H02N 2/00 (2006.01)
H02N 2/12 (2006.01)

(56) References Cited

U.S. PATENT DOCUMENTS

| | | | |
|---|---|---|---|
| 5,191,688 | A | 3/1993 | Takizawa et al. |
| 5,329,201 | A | 7/1994 | Shirasaki |
| 5,338,998 | A | 8/1994 | Kitani et al. |
| 5,508,581 | A | 4/1996 | Saya et al. |
| 6,288,475 | B1 | 9/2001 | Ito et al. |
| 6,320,299 | B1 | 11/2001 | Kitani et al. |
| 7,619,348 | B2 | 11/2009 | Kobayashi et al. |
| 7,705,518 | B2 | 4/2010 | Kurosawa |
| 9,401,666 | B2 * | 7/2016 | Kobayashi ............... G02B 7/08 |
| 2004/0182820 | A1 | 9/2004 | Motowaki et al. |
| 2007/0188051 | A1 * | 8/2007 | Kobayashi ......... C08G 59/4028 |
| | | | 310/323.11 |
| 2008/0297003 | A1 | 12/2008 | Kurosawa |
| 2011/0206428 | A1 | 8/2011 | Fujihara |
| 2011/0273058 | A1 * | 11/2011 | Suefuji .................. H02N 2/163 |
| | | | 310/323.02 |
| 2011/0280559 | A1 | 11/2011 | Ashizawa et al. |
| 2012/0146460 | A1 * | 6/2012 | Suefuji .................. H02N 2/163 |
| | | | 310/323.08 |
| 2016/0041359 | A1 * | 2/2016 | Gaskin ................. G01B 11/272 |
| | | | 250/573 |

FOREIGN PATENT DOCUMENTS

| | | |
|---|---|---|
| JP | 05-244784 | 9/1993 |
| JP | H07177770 A | 7/1995 |
| JP | 08-23687 | 1/1996 |
| JP | H11194640 A | 7/1999 |
| JP | 2003348862 A | 12/2003 |
| JP | 2007-294535 A | 11/2007 |
| JP | 2008-35685 A | 2/2008 |
| JP | 2008-092748 A | 4/2008 |
| JP | 2009232622 | 10/2009 |
| JP | 2009273235 A | 11/2009 |

OTHER PUBLICATIONS

Jun. 23, 2014 Information Statement by a third party issued in Japanese Application No. 2010-025160.
Dec. 11, 2014 Information Statement by a third party issued in Japanese Application No. 2010-025160.
"Material Safety Data Sheet (Polyflon PTFE TC-7109BK)", Y466-6, May 6, 2011, 1/7, pp. 73-79.
Jan. 7, 2014 Office Action issued in Japanese Patent Application No. 2010-025160.
May 17, 2011 Search Report issued in International Patent Application No. PCT/JP2011/052621.

* cited by examiner

VIBRATION ACTUATOR, AND LENS BARREL AND CAMERA PROVIDED WITH SAME

CORRESPONDING APPLICATIONS

This application claims priority to U.S. application Ser. No. 13/577,461, which is in turn a National Stage of PCT/JP2011/052621, filed Feb. 8, 2011. Priority is also claimed to Japanese Patent Application No. 2010-025160, filed Feb. 8, 2010.

TECHNICAL FIELD

The present invention relates to a vibration actuator, and to a lens barrel and camera provided with the same.

BACKGROUND ART

In the prior art, vibration actuators are known, which have an oscillator where an electromechanical conversion element and an elastic body are joined. The vibration actuators generate a progressive oscillatory wave (below referred to as progressive wave) at the elastic body by utilizing the expansion and contraction of the electromechanical conversion element. This progressive wave causes a relative movement member which is in pressure contact with the oscillator (elastic body) to be frictionally driven. In this type of vibration actuator, a highly elastic material, for example a metal material of stainless steel family or the like, is used for the elastic body in order to efficiently transmit the applied vibrations to the relative movement member.

In such a vibration actuator, frictional contact faces of the oscillator and the relative movement member exert a large effect on the stability, efficiency, and the like of the driving of the vibration actuator. Therefore, various attempts have been made to improve the durability and the like of the frictional contact faces.

For example, Patent Document 1 discloses a technique of providing a thermosetting resin film on driven faces (namely, frictionally contacting faces) of a driving body of a rotor and a stator.

Patent Document 1: Japanese Unexamined Patent Application No. 2009-232622

DISCLOSURE OF THE INVENTION

Problems to be Solved by the Invention

For example, in the case of using a thermosetting resin film on one of the frictional contact faces of an oscillator and a relative movement member, and using an anodic oxide film on the other, it is possible to reduce noise when driving and improve the abrasion resistance and the like.

However, due to differences in the hardness between the anodic oxide film and the thermosetting resin film, abrasion occurs after endurance testing, and the starting characteristics may be degraded, accordingly. Further, depending on the type of a thermosetting resin, it may have a high coefficient of water absorption. Accordingly, it may occur that under high temperature and high humidity environments, it deteriorates to adhere and driving is not properly performed.

In the technique disclosed in Patent Document 1, an anodic oxide film is applied to the sliding faces of the stator and the rotor. An anodic oxide film is a hard film principally composed of an oxide film of $Al_2O_3$ oxidized aluminum. Accordingly, the anodic oxide film causes the opposite thermosetting resin to be worn out by frictional driving. Loss marks may occur at the frictional contact face of the worn thermosetting resin. There has been the problem of an increase in the minimum voltage required to start the vibration actuator, resulting from the occurrence of loss marks and transfer of the components lost from the thermosetting resin film to the opposite member.

The problem to be solved by the present invention is to provide a vibration actuator which is easy to manufacture and has favorable driving properties, and a lens barrel and camera provided with the same.

Means for Solving the Problems

The present invention solves the problem described above by the following means.

In the first aspect of the invention, a vibration actuator is provided, which includes an oscillator configured to generate oscillations and a relative movement member which is in pressure contact with the oscillator configured to relatively move with respect to the oscillator due to the oscillations. Of a contact face of the oscillator with respect to the relative movement member and a contact face of the relative movement member with respect to the oscillator, at least one is a thermosetting resin film composed of a polyamide-imide resin and a fluororesin and the other is an anodic oxide film.

In the second aspect of the invention, the vibration actuator according to the first aspect is provided, in which the thermosetting resin film has an indentation hardness of 0.1 to 0.3 GPa.

In the third aspect of the invention, a vibration actuator according to the first or second aspect is provided, in which the anodic oxide film includes a hard anodic oxide film.

In the fourth aspect of the invention, a vibration actuator is provided, which includes an oscillator configured to generate oscillations and a relative movement member which is in pressure contact with the oscillator configured to relatively move with respect to the oscillator due to the oscillations. Of a contact face of the oscillator with respect to the relative movement member and a contact face of the relative movement member with respect to the oscillator at least one is a thermosetting resin film composed of a polyamide-imide resin and a fluororesin and the other is a film having an indentation hardness of 20000 to 30000 GPa.

In the fifth aspect of the invention, the vibration actuator according to the fourth aspect is provided, in which the thermosetting resin film has an indentation hardness of 01. to 0.3 GPa.

In the sixth aspect of the invention, the vibration actuator according to the fourth or fifth aspect is provided, in which the film includes an anodic oxide film.

In the seventh aspect of the invention, the vibration actuator according to any one of the fourth to sixth aspects is provided, in which the anodic oxide film includes a hard anodic oxide film.

In the eighth aspect of the invention, the vibration actuator according to any one of the first to seventh aspects is provided, in which the thermosetting resin includes a pigment.

In the ninth aspect of the invention, the vibration actuator according to the eighth aspect is provided, in which the hardness of the pigment is 15000 to 50000 GPa.

In the tenth aspect of the invention, the vibration actuator according to the eighth or ninth aspect is provided, in which the pigment has a weight ratio of 20 to 50 with respect to 100 of the polyamide-imide.

In the eleventh aspect of the invention, the vibration actuator according to any one of the first to tenth aspects is provided, in which a work rate of indentation of the thermosetting resin film is 30% or less.

In the twelfth aspect of the invention, the vibration actuator according to any one of the first to eleventh aspects is provided, in which the fluororesin has a weight ratio of 20 to 50 with respect to 100 of the polyamide-imide.

In the thirteenth aspect of the invention, a lens barrel is provided, which includes the vibration actuator according to any one of the first to twelfth aspects.

In the fourteenth aspect of the invention, a camera is provided, which includes the vibration actuator according to any one of the first to twelfth aspects.

Effects of the Invention

According to the present invention, it is possible to provide a vibration actuator which is easy to manufacture and has favorable driving properties, and a lens barrel and camera provided with the same.

EXPLANATION OF REFERENCE NUMERALS

Figure 1:
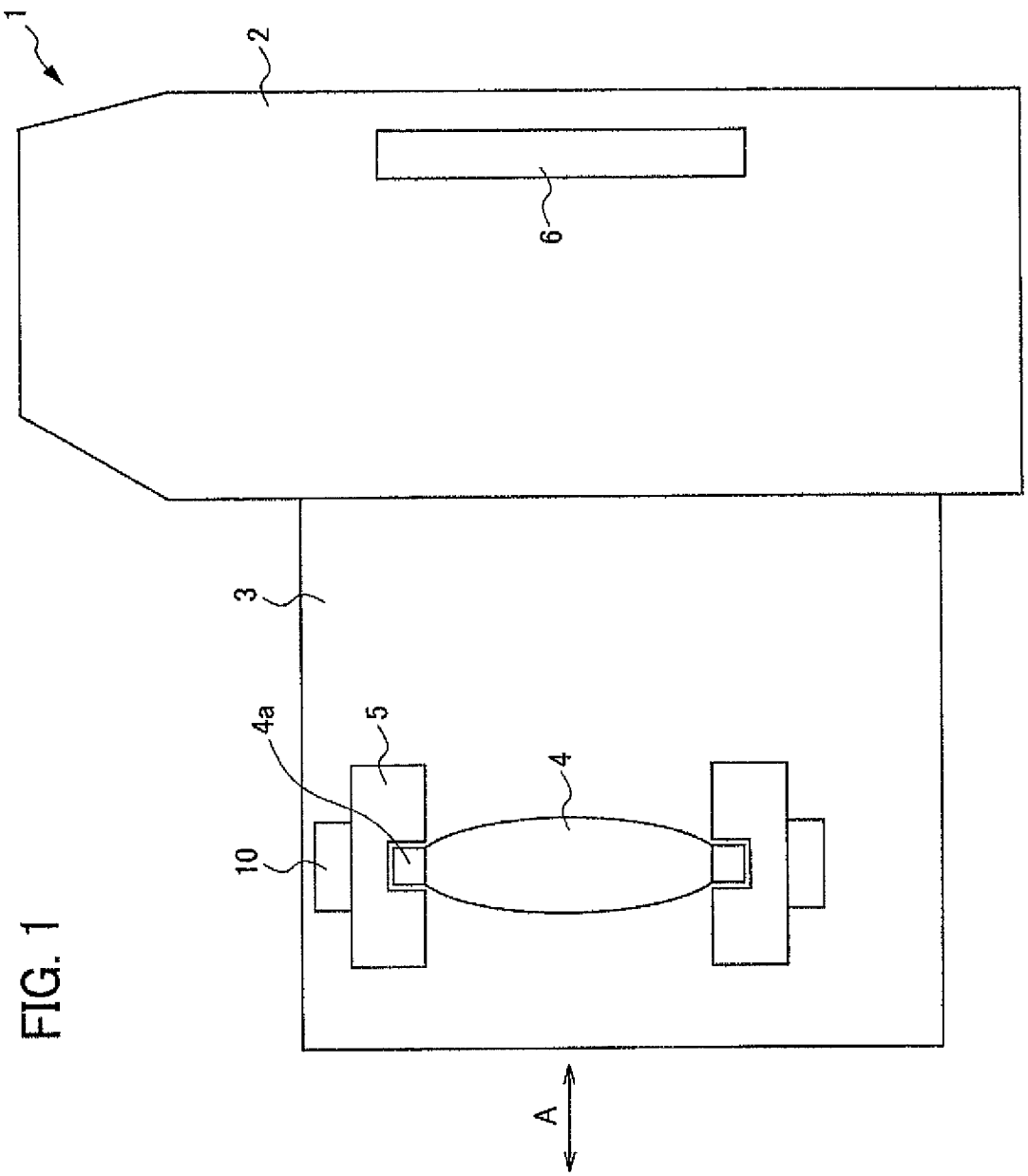
FIG. 1 is a drawing showing a camera of the first embodiment.

1: camera
3: lens barrel
10, 20: ultrasonic wave motor
13, 23: oscillator
15, 25: moving body
18, 31: resin film
18b: pigment
19, 32: anodic oxide film

PREFERRED MODE FOR CARRYING OUT THE INVENTION

First Embodiment

FIG. 1 is a drawing showing a camera 1 of the first embodiment.

The camera 1 of the first embodiment is provided with a camera body 2 having an imaging element 6 and a lens barrel 3. The lens barrel 3 is an interchangeable lens which is mountable on and dismountable from the camera body 2. It should be noted that the camera 1 of the present embodiment shows an example where the lens barrel 3 is an interchangeable lens. However, it is not limited to this, and it may alternatively be possible that the lens barrel 3 is integrated with a camera body, for example.

The lens barrel 3 is provided with a lens 4, a cam tube 5, an ultrasonic wave motor 10, and the like. In the present embodiment, an ultrasonic wave motor is explained as an example of a vibration actuator. The ultrasonic wave motor 10 has an approximately annular shape, and is disposed in the lens barrel 3 so that a direction of a central axis of the annulus substantially coincides with a direction of an optical axis (the direction shown by an arrow "A" in FIG. 1). The ultrasonic wave motor 10 is used as a driving source to drive the lens 4 during a focusing action of the camera 1. A driving force provided by the ultrasonic wave motor 10 is transmitted to the cam tube 5. A lens frame 4a of the lens 4 is cam-engaged with the cam tube 5. When the cam tube 5 rotates about the optical axis by the driving force applied by the ultrasonic wave motor 10, the lens 4 moves in the direction of the optical axis to adjust focusing.

In FIG. 1, a lens group, (including lens 4) which is not shown in the drawings and provided in the lens barrel 3, forms an image of a photographic subject at an imaging face of the imaging element 6. The imaging element 6 converts the formed image of the photographic subject to an electric signal, which undergoes A/D conversion to be image data.

Figure 2:
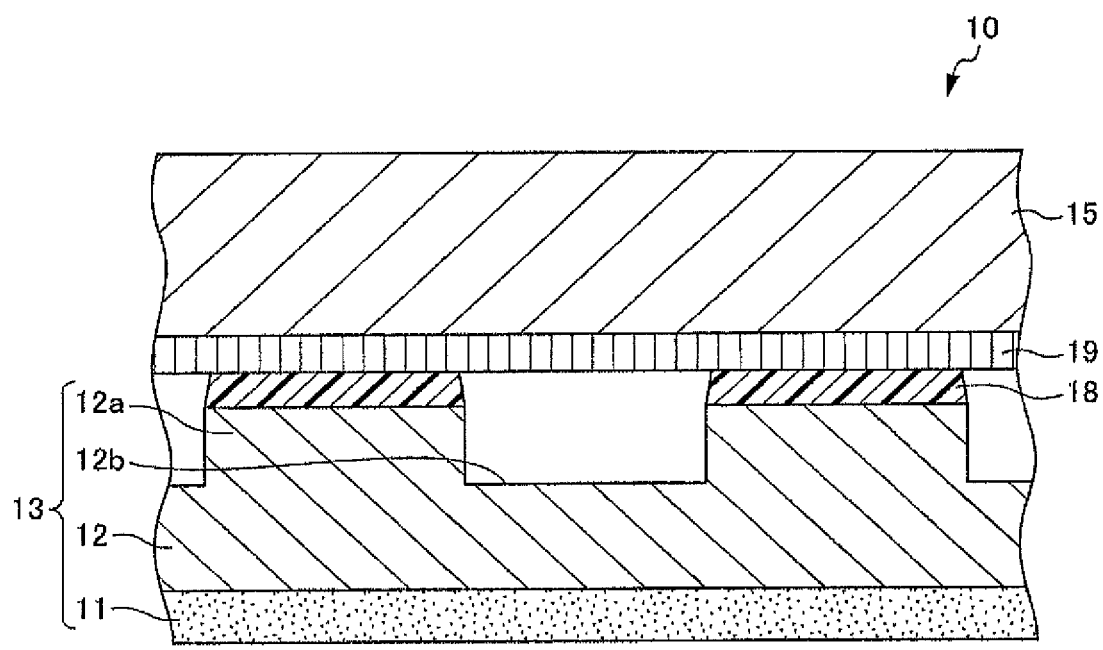
FIG. 2 is a drawing showing an ultrasonic wave motor according to the first embodiment.

FIG. 2 is a drawing showing the ultrasonic wave motor 10 of the first embodiment.

The ultrasonic wave motor 10 of the present embodiment is provided with an oscillator 13 including a piezoelectric body 11 and an elastic body 12; a moving body 15; a flexible printed circuit board 14; a vibration absorbing member 16; a support 17 and the like.

The piezoelectric body 11 has the function of converting electric energy into mechanical energy. In the present embodiment, a piezoelectric element is used as the piezoelectric body 11, but an electrostrictive element may be alternatively used. The piezoelectric body 11 is fixed to the support 17 provided at the lens barrel 3 via a vibration absorbing member 16 such as felt or the like.

The piezoelectric body 11 has electrodes (not shown) formed thereon. The piezoelectric body 11 expands and contracts in accordance with a driving signal supplied from the flexible printed circuit board 14 electrically connected with the electrode portions, and causes the elastic body 12 to be excited.

The elastic body 12 is a member which generates a progressive wave due to the excitation caused by the piezoelectric body 11. The elastic body 12 is formed of a ferroalloy such as stainless steel, Invar steel or the like, having a high elastic modulus. The elastic body 12 of the present embodiment is formed of SUS303.

The elastic body 12 is a substantially annular shaped member. The piezoelectric body 11 is adhered to one face of the elastic body 12 by an adhesive or the like having electrical conductivity.

A comb-tooth portion 12a having a plurality of grooves 12b is provided at the other face. End faces of the comb-tooth portion 12a are contact faces in pressure contact with the later described moving body 15. The moving body 15 is rotationally driven by progressive waves generated at this face. On the end faces of the comb-tooth portion 12a, a resin film 18 (refer to FIG. 3) having a polyamide-imide resin as the principal material is formed. This resin film 18 will be explained in detail later.

The moving body 15 is a substantially annular shaped member formed of a metal such as an aluminum alloy or the like. The moving body 15 of the present embodiment is formed of an aluminum alloy.

The moving body 15, with which the oscillator 13 (the elastic body 12) comes into contact, is frictionally driven by the progressive waves. An anodic oxide film layer 19 is formed at a contact face of the moving body 15, which is in contact with the oscillator 13 (refer to FIG. 3).

The flexible printed circuit board 14 is electrically connected with predetermined electrodes of the piezoelectric body 11, and is a member which supplies a driving signal to the piezoelectric body 11.

Further, a controller 108 which performs control of the camera 1 is connected to the flexible printed circuit board 14. A temperature sensor 109 is connected to the controller 108. The controller 108 adjusts the frequency of the driving signal supplied to the piezoelectric body 11 according to the detection performed by the temperature sensor 109 so that the rotational speed of the ultrasonic wave motor 10 is maintained constant.

Figure 3:
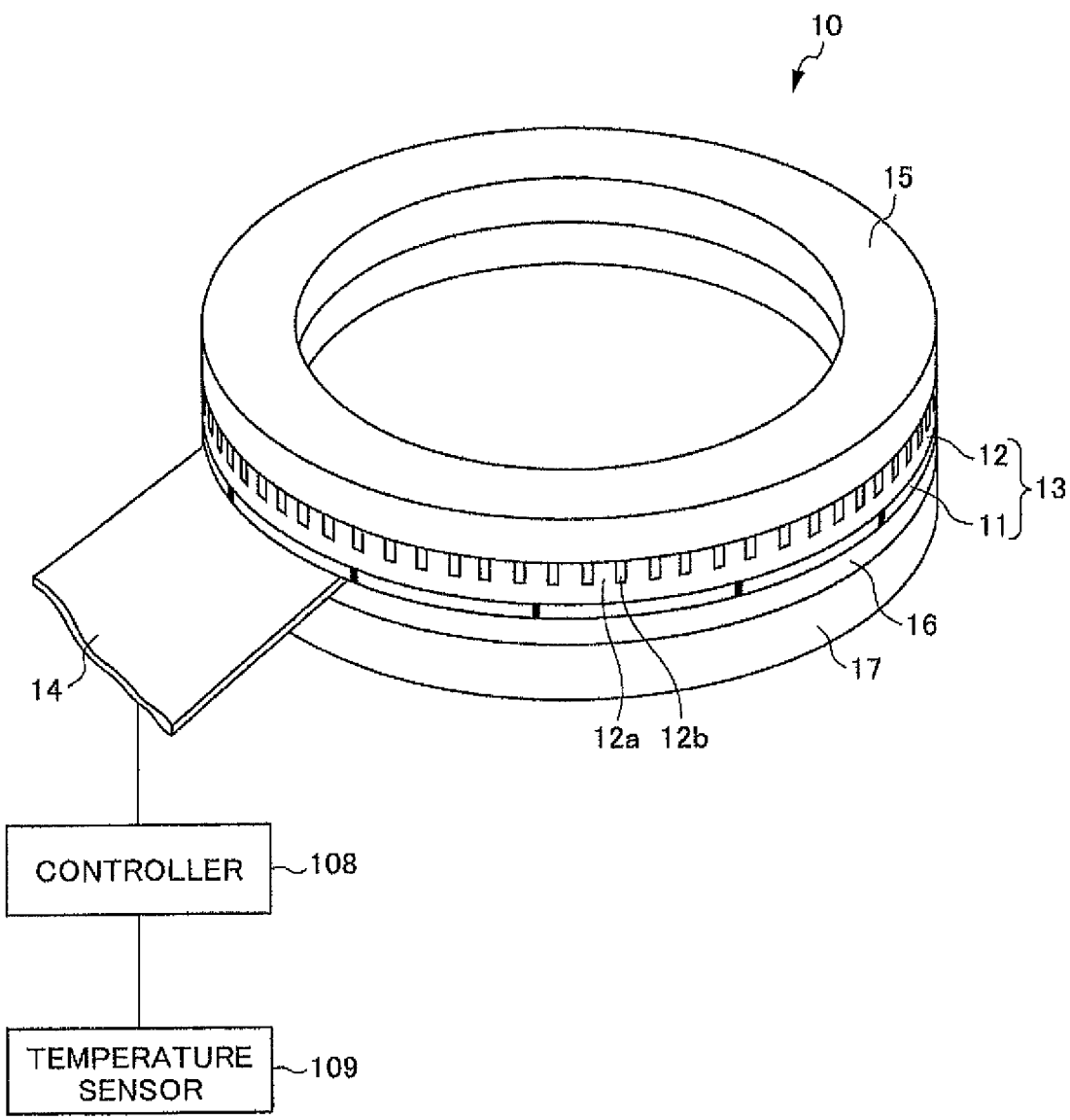
FIG. 3 is an enlarged drawing showing frictional contact faces of an elastic body and a moving body of the ultrasonic wave motor of the first embodiment.

FIG. 3 is an enlarged drawing of the contact portion of the elastic body 12 and the moving body 15 of the ultrasonic wave motor 10 of the first embodiment. It should be noted that a portion of the cross section in a peripheral direction of the ultrasonic wave motor 10 is enlarged in FIG. 3.

The resin film 18 is provided at the contact face (the end faces of the comb-tooth portion 12a) of the elastic body 12, which is in contact with the moving body 15. The anodic oxide film layer 19 is provided at the contact face of the moving body 15, which is in contact with the elastic body 12. Accordingly, the oscillator 13 and the moving body 15 are in frictional contact with each other through the resin film 18 and the anodic oxide film layer 19.

Figure 4:
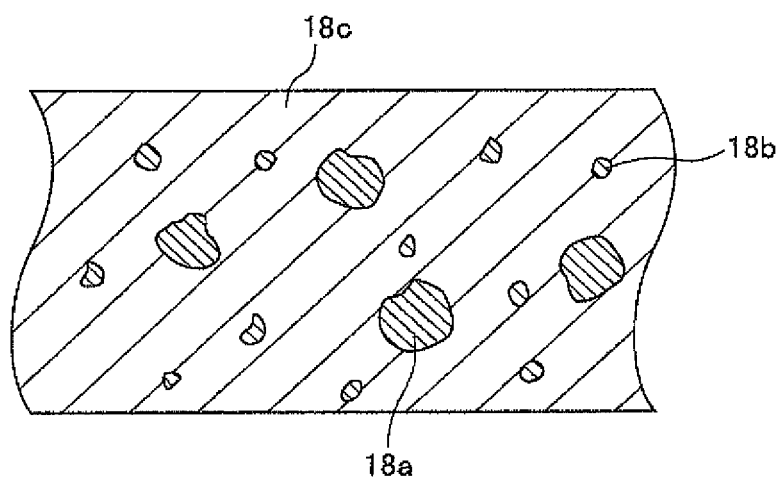
FIG. 4 is a drawing schematically showing the structure inside a resin film.

FIG. 4 is a cross sectional drawing schematically showing the resin film 18 of the present embodiment. The resin film 18 of the present embodiment is formed by applying a coating which has a polyamide-imide resin 18c as the principal raw material, to which polytetrafluoroethylene (below referred to as PTFE) 18a and a pigment 18b are added.

In the resin film 18 of the present embodiment, 30 parts by weight of the PTFE 18a, and 30 parts by weight of a cobalt nickel pigment 18b are mixed with respect to 100 parts by weight of the polyamide-imide resin 18c.

Further, the resin film 18 is used with the surface ground to approximately 10 µm. At this time the surface roughness Rz (JIS B0601-2001) is 0.5 µm or less, and the film thickness after grinding is 15 µm.

Further, unless otherwise stated, the amounts of the PTFE 18a and the pigment 18b are based on the weight of the polyamide-imide resin 18c which is the principal component, and are shown as a ratio where the weight of the polyamide-imide resin is set to 100.

The resin film 18 having the polyamide-imide resin 18c as the principal raw material is excellent compared with the case of using a coating of another resin in terms of: hardness; plastic deformation resistance; adhesion and peel strength; abrasion resistance; heat resistance; coating stability; formability; boiling water resistance; and the like.

Therefore, the resin film 18 formed of the polyamide-imide resin 18c mixed with PTFE 18a and the pigment 18b provides expected effects such as the following.

(1) Since the resin film 18 is harder compared to resin films formed of other resins such as an epoxy resin or the like, it is possible to increase the abrasion resistance and plastic deformation resistance of the contact face which is in contact with the moving body 15 (the anodic oxide film layer 19).

(2) The peeling strength and the adherence of the resin film 18 to the oscillator 13 (the elastic body 12) will increase, and the durability of the resin film 18 will increases.

(3) Since the heat resistance of the resin film 18 increases, it is possible to prevent deformation of the resin film 18 due to frictional heat generated when the ultrasonic wave motor 10 is in operation.

(4) Since the water resistance of the resin film 18 increases, it is possible to prevent chemical deterioration of the resin film 18 due to airborne moisture.

The PTFE 18a included in the resin film 18 of the present embodiment is granular, as shown in FIG. 4. The average of the diameter of the primary grains of this PTFE 18a is from 1 to 5 µm. It should be noted that since the film thickness of the resin film 18 of the present embodiment is 30 µm, PTFE 18a having this size is used. However, it may alternatively be that an appropriate average size of the PTFE 18a is selectable according to the film thickness.

Since the PTFE 18a having high lubrication qualities reduces the coefficient of friction, it increases the starting performance at low speeds of the ultrasonic wave motor. In addition, since the PTFE 18a has a high water repellence, it may be expected that adhesion between the resin film 18 and the anodic oxide film layer 19 is prevented under high temperature and high humidity conditions.

As shown in FIG. 4, the resin film 18 of the present embodiment includes the pigment 18b. If the hardness of the pigment included in the resin film 18 is less than 15000 GPa, it will easily adhere to the opposite material (the anodic oxide film layer 19) with which it is in contact. This is not preferable since the resin film 18 itself may be damaged by such an adhered pigment. Further, if greater than 50000 GPa, the pigment is easily broken to roughen the surface of the resin film 18. This is not preferable since the roughened resin material 18 may damage the opposite material (the anodic oxide film layer 19) with which the resin material 18 is in contact. Accordingly, the hardness of the pigment is preferably between 15000 and 50000 GPa.

The pigment 18b of the present embodiment is cobalt nickel which has a hardness within the above described 15000 to 50000 GPa, and its average grain diameter is 1 to 3 µm. Since the inclusion of the pigment 18b increases the denseness of the resin film 18, the hardness and plastic deformation resistance are increased, accordingly. Further, the pigment 18b transmits the heat generated by the frictional driving in the contact face of the resin member 18 with the moving body 15 (the anodic oxide film layer 19) to the outside of the contact face. Accordingly, the pigment 18 prevents the heat to be confined inside the contact face, and has the effect of improving the driving efficiency.

Further, since the pigment 18b increases the coefficient of friction between the oscillator 13 and the moving body 15 (namely, the coefficient of friction between the resin film 18 and the anodic oxide film layer 19), the holding torque and the maximum load torque will increase.

This resin film 18 is formed according to the following process.

First, the contact face (the end face of the comb-tooth portion 12a) of the elastic body 12 in contact with the moving body 15 is subject to a degreasing treatment. At this time, a surface roughening treatment such as blast etching or the like may be carried out to further increase the adherence.

A solution is made by mixing PTFE 18a, a cobalt nickel additive, and N-methylpyrrolidone with the polyamide-imide resin 18c. This solution is coated onto the frictional contact face of the elastic body 12, and after preheating, is held at a temperature of about 250° C. for 20 to 60 minutes to dry cure. After the curing, the surface of the resin film 18 is polished and leveled using green carborundum or the like.

On the other hand, the anodic oxide film layer 19 is formed by applying an anodic treatment to a surface of the moving body 15 made of an aluminum alloy (A6061).

The oscillator 13 is formed by joining the piezoelectric body 11 to the elastic body 12 on which the resin film 18 is formed. The oscillator 13 and moving body 15 are disposed such that the resin film 18 of the oscillator 13 and the anodic oxide film layer 19 of the moving body 15 are in contact with each other, and the various members are assembled. The ultrasonic wave motor 10 is manufactured through these processes.

Here, ultrasonic wave motors 10 of Measurement Examples 1 to 13 with differing added amounts of the PTFE 18a and the pigment 18b additives and the like with respect to the polyamide-imide resin 18c (ratios with respect to the weight of the polyamide-imide resin), and an ultrasonic wave motor 10 of Measurement Example 14 (Comparative Example) where an epoxy resin coating film is applied to a frictional contact face of an oscillator 13 were prepared. The minimum rotational speed at noise occurrence and performances associated with driving of the ultrasonic wave motors 10 were investigated, which include: the holding torque; maximum torque; minimum starting voltage; abrasion characteristics and the like.

Further, the indentation hardness of the polyamide-imide resin film 18 and the anodic oxide film layer 19 was measured. The indentation hardness represents the hardness obtained from the relationship between the test force of a process of thrusting an indenter and the depth of indentation, according to the stipulations of ISO 14577-1, "Instrumented Indentation Test for Hardness".

The work rate of indentation can also be obtained from a load-indentation depth curve. The work rate of indentation is defined as "an amount of work for an elastic deformation/(the amount of work for the elastic deformation+an amount of work for a plastic deformation)".

Table 1 is a table showing the measurement results of the holding torque and the like for the ultrasonic wave motors 10 of Measurement Examples 1 to 13 and for Comparative Example 14.

[Table 1]

The ultrasonic wave motors 10 of Measurement Examples 1 to 13 have approximately the same setup as the ultrasonic wave motor 10 of the present embodiment, other than differing in the added amounts of the additives such as PTFE and the like, and the hardness. The ultrasonic wave motor of Measurement Example 3 corresponds to the ultrasonic wave motor 10 of the present embodiment.

TABLE 1

| Measurement Example | Resin film | | | | | | Anodic oxide film | |
|---|---|---|---|---|---|---|---|---|
| | Polyamid-imide weight | Epoxy | PTFE weight | Pigment weight | Indentation Hardness Gpa | Work rate % | Indentation Hardness Gpa | HV converted Value indentation hardness/76.36 |
| 1 | 100 | 0 | 60 | 30 | 0.05 | 31 | 27000 | 354 |
| 2 | 100 | 0 | 50 | 30 | 0.1 | | 27000 | 354 |
| 3*1 | 100 | 0 | 30 | 30 | 0.2 | 25 | 27000 | 354 |
| 4 | 100 | 0 | 20 | 30 | 0.3 | | 27000 | 354 |
| 5 | 100 | 0 | 10 | 30 | 0.4 | | 27000 | 354 |
| 6 | 100 | 0 | 30 | 30 | 0.2 | | 16000 | 210 |
| 7 | 100 | 0 | 30 | 30 | 0.2 | | 20000 | 262 |
| 8 | 100 | 0 | 30 | 30 | 0.2 | | 30000 | 393 |
| 9 | 100 | 0 | 30 | 30 | 0.2 | | 40000 | 524 |
| 10 | 100 | 0 | 30 | 60 | 0.4 | | 27000 | 354 |
| 11 | 100 | 0 | 30 | 50 | 0.2 | 23 | 27000 | 354 |
| 12 | 100 | 0 | 30 | 20 | 0.2 | 30 | 27000 | 354 |
| 13 | 100 | 0 | 30 | 10 | 0.1 | | 27000 | 354 |
| 14 | 0 | 100 | 30 | 30 | 0.05 | 38 | 27000 | 354 |

| Measurement Example | Holding torque | Max. torque | Min. starting voltage | Rotational speed at noise occurrence | Resin film Amount of abrasion wear | Loss marks |
|---|---|---|---|---|---|---|
| 1 | Δ0.6 | ×0.5 | ○0.9 | ○1 or more | Δ1.1 | ×YES |
| 2 | ○0.9 | ○0.9 | ○0.9 | ○1 or more | ○1 | ○NO |
| 3*1 | ○1 | ○1 | ○1 | ○1 | ○1 | ○NO |
| 4 | ○1 or more | ○1 or more | ○1 | ○0.9 | ○1 | ○NO |
| 5 | ○1 or more | ○1 or more | Δ1.2 | Δ0.7 | Δ1.5 | ○NO |
| 6 | ○0.9 | ○0.9 | Δ1.2 | ○1 | ○1 | ○NO |
| 7 | ○1 | ○1 | ○1 | ○1 | ○1 | ○NO |
| 8 | ○1 | ○1 | ○1 | ○1 | ○1 | ○NO |
| 9 | ○1 | ○1 | ○1 | Δ0.8 | Δ1.5 | ×YES |
| 10 | ○1 or more | ○1 or more | ○1 | Δ0.8 | ○1 | ○NO |
| 11 | ○1 or more | ○1 or more | ○1 | ○1 | ○1 | ○NO |
| 12 | ○1 | ○1 | ○1 | ○1 | ○1 | ○NO |
| 13 | ○1 | Δ0.8 | ○1 | ○1 | Δ1.3 | ○NO |
| 14 | Δ0.8 | Δ0.7 | Δ1.3 | ○1 | Δ2 | ×YES |

*1: EMBODIMENT STANDARD

Further, the ultrasonic wave motor of Measurement Example 14 (Comparative Example) has approximately the same setup as the ultrasonic wave motor 10 of the present embodiment, other than differing in that an epoxy resin film instead of the polyamide resin film 18 is formed at the contact face of the oscillator and the moving body. The ultrasonic wave motor of this Measurement Example 14 is an example of the ultrasonic wave motors commonly used in the prior art.

The resin film 18 of the ultrasonic wave motor 10 of Measurement Example 1 is now explained.

The resin film 18 of the ultrasonic wave motor 10 of Measurement Example 1 is a resin film in which 60 parts by weight of PTFE and 30 parts by weight of cobalt nickel pigment are mixed with respect to 100 parts by weight of polyamide-imide. Carbon short fibers, silicon beads, and alumina particles are not added to the resin film of the ultrasonic wave motor of Measurement Example 1.

Resin films 18 of the ultrasonic wave motors 10 of Measurement Examples 2 to 5 are varied weight ratios of the PTFE 18a, and the hardness of each resin film 18 differs, accordingly.

Resin films 18 of the ultrasonic wave motors 10 of Measurement Examples 6 to 9 are the same as that of Measurement Example 3, but the hardness of each of the anodic oxide films 19 differs, which are opposite to the resin films 18.

Resin films 18 of the ultrasonic wave motors 10 of Measurement Examples 10 to 13 differ in the weight ratios of the pigments 18b, and the hardness of each resin film 18 differs, accordingly.

A resin film 18 of Measurement Example 14 differs in that an epoxy resin is used as the principal component. In Measurement Example 14, the same ratios of the PTFE 18a and the pigment 18b are added as in Measurement Example 3.

The holding torque shown in Table 1 represents the torque necessary to cause an ultrasonic wave motor 10 in a standstill to be driven at a predetermined driving voltage and rotational speed. A value of holding torque in FIG. 1 shows a ratio of the holding torque of an ultrasonic wave motor of each of the Measurement Examples with respect to the holding torque of the ultrasonic wave motor 10 of Measurement Example 3 (Embodiment Standard), which is set as a standard value (1.0).

The value of the holding torque shown in Table 1 is preferably large from the viewpoints of the effect of improving the driving efficiency and preventing rotation and the like of the moving body when not in use. If the value is greater than 0.9, it is useable as an ultrasonic wave motor 10.

Next, the maximum torque shown in Table 1 is explained. The maximum torque represents the maximum value of the loaded torque drivable by an ultrasonic wave motor, namely, the maximum load torque. A value of the maximum torque shown in Table 1 is a ratio of the maximum load torque of each ultrasonic wave motor 10 with respect to the maximum load torque of the ultrasonic wave motor 10 of Measurement Example 3 (Embodiment Standard), which is set as a standard value (1.0).

The value of the maximum torque shown in Table 1 is preferably 1.0 or greater. If the value is greater than 0.9, it is within an allowable range for the ultrasonic wave motor 10.

A minimum starting voltage represents a minimum voltage at which an ultrasonic wave motor is drivable. The smaller this value is, it is possible to drive the ultrasonic wave motor with the lower electric power. If the value is 1.0 or less, it is within an allowable range for an ultrasonic wave motor 10.

A rotational speed at noise occurrence represents the smallest rotational speed at which a noise occurs when an ultrasonic wave motor 10 is driven under predetermined driving conditions. Since the ultrasonic wave motor 10 normally generates a noise at a rotational speed equal to or above the rotational speed at noise occurrence, it is preferable that the rotational speed at noise occurrence is as large as possible.

An amount of abrasion wear of a resin film 18 is measured and evaluated as a depth of abrasion wear of an elastic body 12 for a case where an ultrasonic wave motor 10 has been rotated 50000 revolutions at a predetermined load torque and rotational speed (load torque of 20 N*mm and rotational speed of 60 rpm). The depth of abrasion wear represents a difference in thickness of an oscillator 13 between before and after its rotational driving, when the thickness of the oscillator 13 before it undergoes 50000 rotations is used as a reference value. The smaller this abrasion depth, the smaller the amount of abrasion wear arising from the driving is, and the more favorable the durability is.

In Table 1, the amount of abrasion wear of the driven ultrasonic wave motor 10 of Measurement Example 14 (Comparative Example) has an abrasion depth of approximately 3.0 µm. For Measurement Examples having an amount of abrasion wear of 1.0 µm or less which is considered to have favorable durability, a circle mark is given in Table 1.

Loss marks of the resin film 18 are detachment marks of the resin film components of a depth of 2 µm or more, generated in the case of having undergone the above 50000 rotations. Since an occurrence of the loss marks causes the driving to be unstable, it is preferable that there are no loss marks.

The measured results for each of the ultrasonic wave motors 10 of Measurement Examples (Measurement Example 1 to Measurement Example 13) and Comparative Example (Measurement Example 14) are now explained.

First, in the ultrasonic wave motor 10 of the Comparative Example (Measurement Example 14), noise is not generated, but there is room for improvement in the other areas of performance (holding torque, maximum torque, minimum starting voltage, abrasion marks, and loss marks).

On the other hand, the holding torque, maximum torque, minimum starting voltage, abrasion marks, loss marks, abrasion amount and low temperature driving characteristics for the ultrasonic wave motors 10 of the Measurement Examples having the resin film 18 with the polyamide-imide resin 18c as the principal component are preferable compared to the ultrasonic wave motor 10 of Comparative Example (Measurement Example 14).

Next, the resin films 18 of the ultrasonic wave motors 10 of Measurement Examples 1 to 5 differ from each other only in the weight ratios of the PTFE 18a. Accordingly, by comparing the driving performance of the ultrasonic wave motors 10 of Measurement Examples 1 to 5, it is possible to understand the influence exerted on the driving performance of an ultrasonic wave motor 10 by the added weight of the PTFE 18a.

When the weight of the PTFE is high, the coefficient of friction becomes low and the torque is reduced, accordingly. Further, the PTFE 18a has good releasability, thus the danger of its loss increases.

On the other hand, when the weight of PTFE is low, the coefficient of friction becomes high and the starting characteristic deteriorates, accordingly.

Measurement Examples 6 to 9 have the same resin film 18 as Measurement Example 3, but the hardness of an anodic oxide film 19 of the opposite face differs. If the anodic oxide film 19 is too hard, the problems of abrasion and noise arise. If it is on the other hand too soft, the minimum starting voltage increases. This is because the relative relationship of the hardness is changed, thus the friction increases. There is also a relationship between the elastic modulus and the motor characteristics (noise).

Measurement Examples 10 to 13 differ from each other only in the weight ratios of the pigment 18b of the resin film 18.

If the weight of the pigment 18b is high, the resin film 18 becomes hard and noise is readily generated.

If the weight of the pigment 18b is low, the strength of the resin film 18 decreases, abrasion increases and the maximum load torque decreases.

For these results, it is understood that if the added weight of the PTFE is 20 to 50 and the added weight of the pigment is 20 to 50 with respect to the weight of 100 of the polyamide-imide resin 18a, it will be favorable to satisfy the desired holding torque and maximum torque, to decrease the power requirement and to prevent noise and friction.

Second Embodiment

Figure 5:
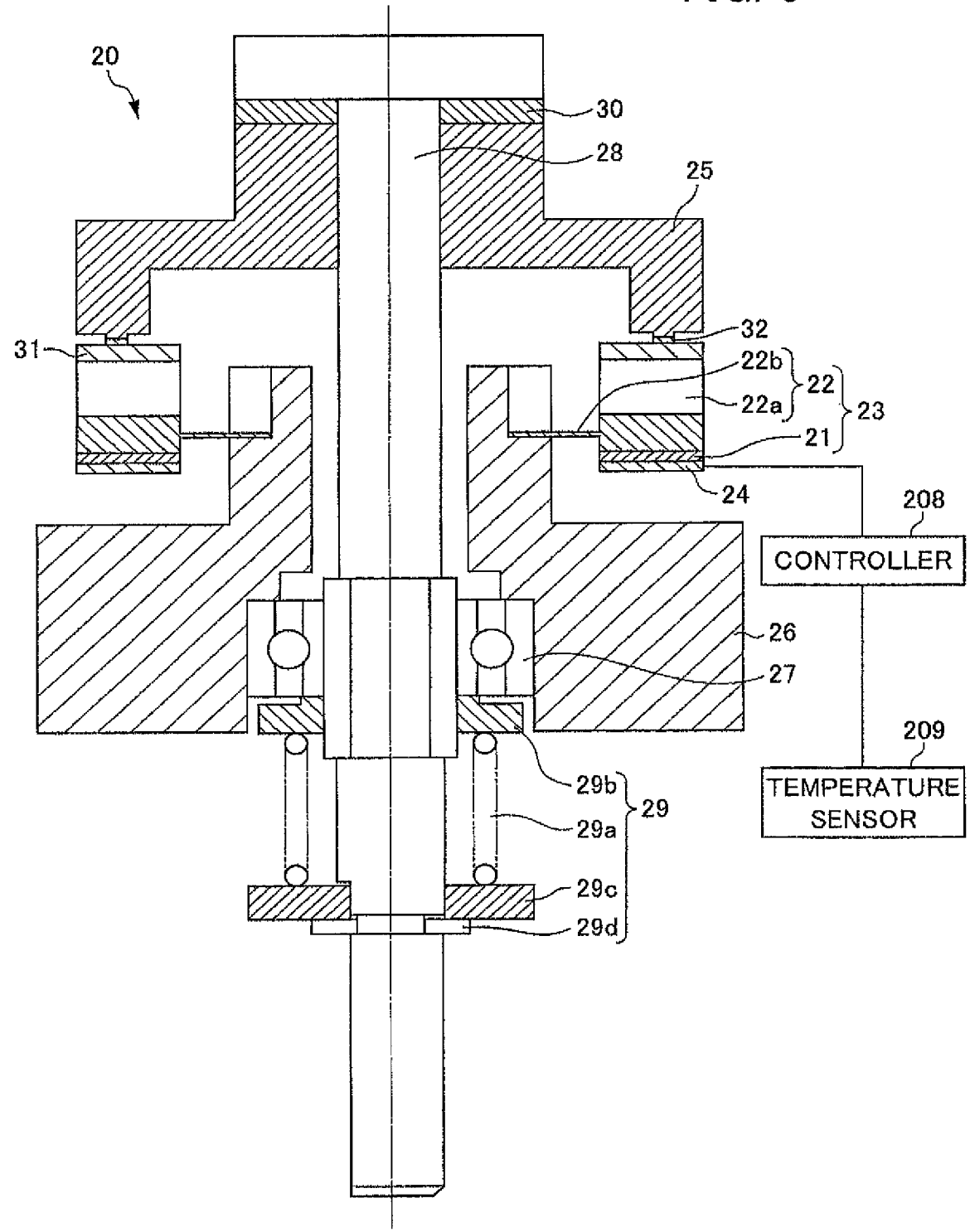
FIG. 5 is a cross sectional drawing showing an ultrasonic wave motor of the second embodiment.

FIG. 5 is a cross sectional drawing showing an ultrasonic wave motor 20 of the second embodiment.

The ultrasonic wave motor 20 of the second embodiment is provided in a lens barrel 3 of a camera 1 in the same way as for the ultrasonic wave motor 10 of the first embodiment, and is used as an actuator for driving a lens 4 to perform a focusing operation. This ultrasonic wave motor 20 differs from the first embodiment in that it is configured to transmit a driving force via a gear (not shown) to a cam tube (not shown) to cause the lens 4 held in the cam tube to be driven.

The ultrasonic wave motor 20 of the second embodiment is provided with an oscillator 23, a moving body 25, an output shaft 28, a pressing portion 29 and the like.

The oscillator 23 is a substantially annular shaped member having an elastic body 22, a piezoelectric body 21 that is joined to the elastic body 22, and the like. The oscillator 23 generates a progressive wave by the expansion and contraction of the piezoelectric body 21.

The elastic body 22 is a substantially annular shaped member formed of a stainless steel, to one face of which the piezoelectric body 21 is joined, and at the other face of which a comb-tooth portion 22a formed by cutting a plurality of grooves in the circumferential direction is provided. An end face of the comb-tooth portion 22a is a contact face which is in pressure contact with the moving body 25 and causes this moving body 25 to be driven by the progressive wave.

A contact face of the oscillator 23 in contact with the moving body 25 has a resin film 31 formed thereon, in the same way as for the oscillator 13 shown in the first embodiment. The resin film 31 of the present embodiment is formed by applying a coating where 30 parts by weight of PTFE and 30 parts by weight of cobalt nickel pigment are mixed with respect to 100 parts by weight of polyamide-imide resin. Further, the film thickness of the resin film 31 is 30 μm, and the surface roughness (JIS B0601-2001) is 0.5 μm.

The elastic body 22 has a flange 22b shaped like a brim extending from an inner periphery of the elastic body 22 in a radial direction. The elastic body 22 is supported at a support body 26 via this flange 22b.

The piezoelectric body 21 has the function of converting electrical energy into mechanical energy. In the present embodiment, in the same way as in the first embodiment, a piezoelectric element is used as the piezoelectric body 21, but it is alternatively possible to use an electrostrictive element. This piezoelectric body 21 expands and contracts according to a driving signal supplied from a flexible printed circuit board 24 electrically connected with prescribed electrodes formed at the piezoelectric body 21, causing the elastic body 22 to vibrate.

A controller 208 which controls the camera provided with the ultrasonic wave motor 20 is connected to the flexible printed circuit board 24. In the present embodiment, a temperature sensor 209 is connected to the controller 208. The controller 208 adjusts the frequency of the driving signal to be supplied to the piezoelectric body 21 in accordance with the detection results of the temperature sensor 209, such that the rotational speed is maintained constant.

The moving body 25 in pressure contact with the oscillator 23 is rotationally driven by an elliptic motion generated by the progressive wave arising at the contact face (the end face of the comb-tooth portion 22a) of the oscillator 23.

The moving body 25 is a member which is formed of a light metal such as an aluminum alloy. The moving body 25 is fit at the output shaft 28. The moving body 25 of the present embodiment is formed of an aluminum alloy, and an anodic oxide film 32 is formed on the contact face of the moving body 25 with which the oscillator 23 is in contact.

Accordingly, the moving body 25 and the oscillator 23 are in frictional contact in such a manner that the anodic oxide film 32 and the resin film 31 are in contact with each other.

The output shaft 28 has a substantially cylindrical form. One end of the output shaft 28 is fitted to the moving body 25 via a rubber member 30, and the other end is rotatably mounted on the support body 26 via a bearing 27. This output shaft 28 rotates integrally with the moving body 25 and transmits the rotational motion of the moving body 25 to a driven member (not shown) such as a gear or the like.

The pressing portion 29 is a mechanism configured to apply pressure to the oscillator 23 and the moving body 25. The pressing portion 29 is provided with a spring 29a, a pressing ring 29b, a pressing ring 29c and an E-ring 29d. The spring 29a generates a pressing force. The pressing ring 29b, which is disposed in contact with the bearing 27, presses one end of the spring 29a. The pressing ring 29c presses the other end of the spring 29a. The E-ring 29d which is inserted into a groove "I" formed at the output shaft 28 regulates the position of the pressing ring 29c.

In the ultrasonic wave motor 20 as shown in the present embodiment, the resin film 31 is formed at the frictional contact face of the oscillator 23 such that the abrasion wear is decreased, the noise is decreased, the durability is increased, the driving performance is stabilized, and the starting characteristics are improved.

Further, the ultrasonic wave motor 20 shown in the present embodiment has the problem of heat generation because it is often produced as a miniaturized ultrasonic wave motor having a small diameter compared to the ultrasonic wave motor shown in the first embodiment. However, the resin film 31 according to the present embodiment is excellent in heat radiation because of the use of the pigment. In addition, as the adherence of the coating of the polyamide-imide resin is favorable, it is possible to eliminate a process of applying primer or the like which is necessary with epoxy resins or the like.

Modifications

Various modifications and variations are possible, without being limited to the above explained embodiments.

(1) In each of the embodiments, the use of cobalt nickel has been shown as the pigment, for example. However, it is not limited to this, and it may alternatively be possible to adopt carbon black or the like.

(2) In each of the embodiments, an example has been shown using hard anodic oxide as the anodic oxide. However, it is not limited to this, and it may alternatively be possible to adopt sulfuric acid anodic oxide or oxalic acid anodic oxide.

(3) In each of the embodiments, an example has been shown where the resin films 18, 31 are formed at the contact faces of the oscillators 13, 23 (the end faces of the comb-tooth portion 12a, 22a). It is not limited to this, and it may alternatively be possible that the resin films are formed at the contact faces of the moving bodies 15, 25. Further, it may alternatively possible that both of the contact faces of the oscillators 13, 23, and the contact faces of the moving bodies 15, 25 have the resin films formed thereon.

Furthermore, it may alternatively be possible that a vibration actuator is adopted in which the piezoelectric body and the moving body are in frictional contact instead of using an elastic body. In this case, it may be sufficient that the resin film is formed at least one of the contact face of the piezoelectric body facing the moving body, and the contact face of the moving body facing the piezoelectric body.

(4) In each of the embodiments, stainless steel has been used as the material for forming the elastic bodies 12, 22. However, it may alternatively be possible to use another iron material. For example, various types of ferrous materials such as S15C, S55C, SCr445, SNCM630 and the like may be alternatively used, and phosphor bronze or aluminum alloys may be alternatively used.

(5) In each of the embodiments, an example has been shown where the moving bodies 15, 25 are formed of an aluminum alloy. However, it is not limited to this, and an iron type material may be alternatively used. For example, various types of ferrous materials such as S15C, S55C, SCr445, SNCM630 and the like may be alternatively used. Further, it may alternatively be possible to use a resin with high heat resistance such as polyimide resin or PEEK (polyetheretherketone) resin or the like.

(6) In each of the embodiments, an example has been shown where PTFE is used as the fluororesin. However, it is not limited to this, and it may alternatively be possible to select a suitable fluororesin. For example, it may be possible to list up: PFA (tetrafluoroethylene-perfluoroalkylvinyl ether copolymer), FEP (tetrafluoroethylene-hexafluoropropylene copolymer), PCTFE (polychloro-trifluoroethylene copolymer), ETFE (ethylene tetrafluoroethylene copolymer), ECTFE (ethylene chlorotrifluoroethylene copolymer), PVDF (polyvinylidene fluoride), PVF (polyvinylfluoride) and the like.

(7) In each of the embodiments, an example has been shown of an ultrasonic wave motor where the moving bodies 15, 25 are rotationally driven. However, it is not limited to this, and it may alternatively be possible to adopt a linear type vibration actuator where the moving body is driven in a straight line. Further, in each of the embodiments, an example has been given of a rotating type (cylindrical) ultrasonic wave motor where the moving bodies 15, 25 are rotationally driven. The reason for this is that since this type of ultrasonic wave motor may often cause a problem of adhesion, it is possible to obtain a large effect if the present invention is applied to.

(8) In each of the embodiments, an explanation has been given for an example of an ultrasonic wave motor using oscillations in the ultrasonic range. However, it is alternatively be possible to adopt a vibration actuator using oscillations outside of the ultrasonic region.

(9) In each of the embodiments, an example has been shown where the ultrasonic wave motors 10, 20 are used as an actuator for performing a focusing operation of a lens barrel of a camera. However, it is not limited to this, and it may alternatively be possible that they are used as an actuator for performing a zooming operation of a lens barrel. Further, it may alternatively be possible to use the ultrasonic wave motors 10, 20 as an actuator of a copy machine or the like, a driving portion of a steering wheel tilt device or a headrest of an automobile or the like.

Further, the embodiments and modifications may be used in appropriate combinations, but detailed explanations of such are omitted. Further, the present invention is not limited by the above explained embodiments.

The invention claimed is:

1. A vibration actuator comprising:
an oscillator configured to generate oscillations, and
a movement member configured to move due to the oscillations of the oscillator, wherein
at least one of (a) a contact face of the oscillator with respect to the movement member and (b) a contact face of the movement member with respect to the oscillator is a resin film composed of a polyamide-imide resin into which are added (i) a fluororesin whose weight is smaller than that of the polyamide-imide resin and (ii) a pigment whose weight is smaller than that of the polyamide-imide resin.

2. The vibration actuator according to claim 1, wherein the resin film has an indentation hardness of 0.1 to 0.3 GPa.

3. The vibration actuator according to claim 1, wherein the pigment has a hardness of 15000 to 50000 GPa.

4. The vibration actuator according to claim 1, wherein the fluororesin has a weight ratio of 20 to 50 with respect to 100 of the polyamide-imide.

5. The vibration actuator according to claim 3, wherein the pigment has a weight ratio of 20 to 50 with respect to 100 of the polyamide-imide.

6. A lens barrel provided with the vibration actuator according to claim 1.

7. A camera provided with the vibration actuator according to claim 1.

* * * * *